US012585723B2

(12) United States Patent
Ning et al.

(10) Patent No.: US 12,585,723 B2
(45) Date of Patent: Mar. 24, 2026

(54) INFORMATION DISPLAY METHOD AND APPARATUS, TERMINAL, AND STORAGE MEDIUM

(71) Applicant: Beijing Zitiao Network Technology Co., Ltd., Haidian District Beijing (CN)

(72) Inventors: Liaoyuan Ning, Beijing (CN); Guangyu Zhang, Beijing (CN); Cong Wang, Beijing (CN); Xinru Zhang, Beijing (CN); Song Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 194 days.

(21) Appl. No.: 18/561,659

(22) PCT Filed: Jul. 22, 2022

(86) PCT No.: PCT/CN2022/107351
§ 371 (c)(1),
(2) Date: Nov. 16, 2023

(87) PCT Pub. No.: WO2023/001276
PCT Pub. Date: Jan. 26, 2023

(65) Prior Publication Data
US 2024/0248945 A1 Jul. 25, 2024

(30) Foreign Application Priority Data

Jul. 23, 2021 (CN) .......................... 202110839635.0

(51) Int. Cl.
*G06F 16/958* (2019.01)
(52) U.S. Cl.
CPC ................................. *G06F 16/958* (2019.01)

(58) Field of Classification Search
CPC ..................................................... G06F 16/958
See application file for complete search history.

(56) References Cited

U.S. PATENT DOCUMENTS 7,315,826 B1 * 1/2008 Guheen .............. G06Q 30/0201
705/7.29
10,985,970 B1 4/2021 Goyal et al.
(Continued)

FOREIGN PATENT DOCUMENTS

CN 102567125 A 7/2012
CN 103927354 A 7/2014
(Continued)

OTHER PUBLICATIONS

First Office Action for Chinese Patent Application No. 202110839635.0, mailed on Nov. 29, 2024, 19 pages.
(Continued)

*Primary Examiner* — Minh Chau Nguyen
(74) *Attorney, Agent, or Firm* — Astute IP Law Group

(57) ABSTRACT

An information display method and apparatus, a terminal, and a storage medium. The information display method comprises the following steps, executed by a first plug-in of a browser: when a page with a first system is opened in the browser, in response to a first operation event, determining target information of the currently-opened page, and displaying information associated with the target information. The first system is one of at least two preset systems, and the associated information is sourced from a system of the at least two preset systems apart from the first system. The user can conveniently check detailed information of a target object at any time without needing to access multiple preset systems.

19 Claims, 4 Drawing Sheets

Determine target information in a currently opened page in response to a first operation event under the condition that a page of a first system is opened in a browser ........... S11

Display associated information of the target information ........... S12

(56)                    References Cited

U.S. PATENT DOCUMENTS

| | | | |
|---|---|---|---|
| 2008/0126318 A1* | 5/2008 | Frankovitz | H04L 43/00 709/224 |
| 2015/0121257 A1* | 4/2015 | Kollencheri Puthenveettil | G06F 3/0488 715/760 |
| 2016/0012465 A1* | 1/2016 | Sharp | G06Q 20/321 705/14.17 |
| 2017/0132225 A1* | 5/2017 | Rothchild | H04N 1/00344 |

FOREIGN PATENT DOCUMENTS

| | | |
|---|---|---|
| CN | 103971244 A | 8/2014 |
| CN | 104331474 A | 2/2015 |
| CN | 108108377 A | 6/2018 |
| CN | 108334379 A | 7/2018 |
| CN | 110516080 A | 11/2019 |
| CN | 110825600 A | 2/2020 |
| CN | 112950331 A | 6/2021 |

OTHER PUBLICATIONS

Second Office Action for Chinese Patent Application No. 202110839635. 0, mailed on Apr. 11, 2025, 25 pages.
"The Best Tool for Online Shopping Comparison! I Saved 30% of My Money", https://zhuanlan.zhihu.com/p/79117701, Aug. 21, 2019, 18 Pages.
International Search Report in PCT/CN2022/107351, mailed Sep. 21, 2022, 5 pages.

* cited by examiner

Figure 1:
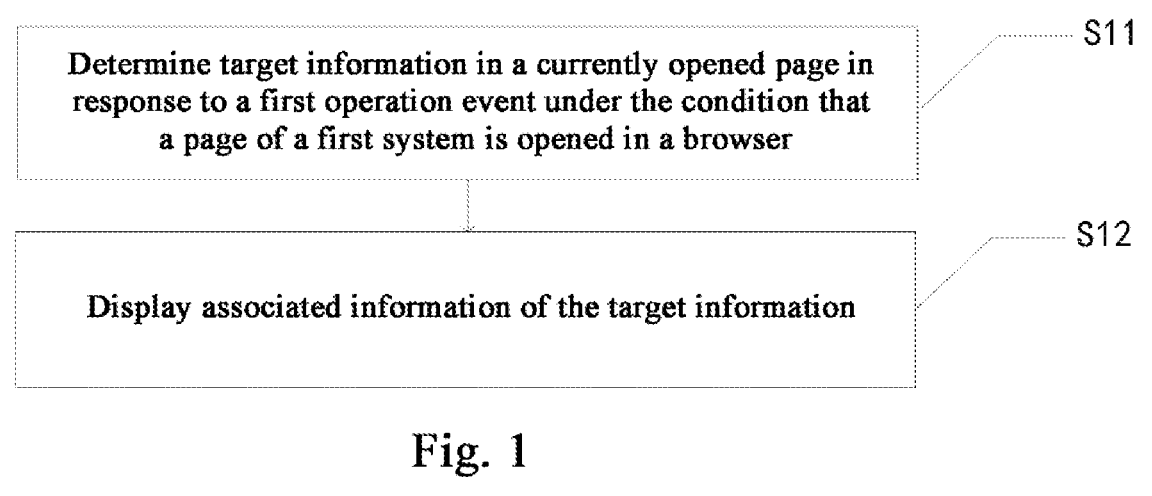

Determine target information in a currently opened page in response to a first operation event under the condition that a page of a first system is opened in a browser

S11

Display associated information of the target information

INFORMATION DISPLAY METHOD AND APPARATUS, TERMINAL, AND STORAGE MEDIUM

CROSS-REFERENCE TO RELATED APPLICATION(S)

This application is a national stage application under 35 U.S.C. 371 based on International Patent Application No. PCT/CN2022/107351, filed Jul. 22, 2022, which claims priority to Chinese Patent Application No. 202110839635.0, filed on Jul. 23, 2021 and entitled "INFORMATION DISPLAY METHOD AND APPARATUS, TERMINAL, AND STORAGE MEDIUM", the disclosures of which are incorporated herein in its entirety by reference.

FIELD

The disclosure relates to the technical field of computers, in particular to information display method and apparatus, terminal, and storage medium.

BACKGROUND

In the process of producing and managing products, associated information of the products will be viewed. Products often involve different types of associated information, which is stored in different systems of an enterprise. For example, information on production links is stored in an internal generation system, product storage information is stored in a storage system, and product test information is stored in a test system.

SUMMARY

The disclosure provides information display method and apparatus, terminal, storage medium.

The disclosure adopts the following technical solution: In some examples, the disclosure provides a method for displaying information. The method is executed by a first plug-in of a browser, and includes:

determining target information in a currently opened page in response to a first operation event under the condition that a page of a first system is opened in the browser and displaying associated information of the target information; where the first system is one of at least two preset systems, and the associated information is derived from the other system except the first system in the at least two preset systems.

In some examples, the disclosure provides a method for processing information. The method includes:

receiving an information obtaining request transmitted by a first plug-in of a browser under the condition that a page of a first system is opened in the browser, where the information obtaining request includes target information;

obtaining associated information of the target information based on the information obtaining request, where the first system is one of at least two preset systems, and the associated information is derived from the other system except the first system in the at least two preset systems; and transmitting query result information, where the query result information includes the associated information of the target information.

In some examples, the disclosure provides an apparatus for displaying information. The apparatus is used by a first plug-in of a browser, and includes:

a determination unit configured to determine target information in a currently opened page in response to a first operation event under the condition that a page of a first system is opened in the browser; and a display unit configured to display associated information of the target information; where the first system is one of at least two preset systems, and the associated information is derived from the other system except the first system in the at least two preset systems.

In some examples, the disclosure provides an apparatus for processing information. The apparatus includes:

a transmission module configured to receive an information obtaining request transmitted by a first plug-in of a browser under the condition that a page of a first system is opened in the browser, where the information obtaining request includes target information; and an obtaining module configured to obtain associated information of the target information based on the information obtaining request, where the first system is one of at least two preset systems, and the associated information is derived from the other system except the first system in the at least two preset systems; where the transmission module is further configured to transmit query result information, where the query result information includes the associated information of the target information.

In some examples, the disclosure provides a terminal. The terminal includes: at least one memory and at least one processor; where the memory is configured to store program codes, and the processor is configured to execute the method described above by calling the program codes stored in the memory.

In some examples, the disclosure provides a computer-readable storage medium. The computer-readable storage medium is configured to store program codes, where the program codes are configured to execute the method described above when executed by a processor.

According to the method for processing information provided by the example of the disclosure, in response to the first operation event, under the condition that the page of the first system is opened in the browser, the first plug-in of the browser determines the target information in the currently opened page in response to the first operation event, and displays the associated information of the target information. According to the method provided by the example of the disclosure, a user can conveniently check associated information of the target information stored in different preset systems at any time.

BRIEF DESCRIPTION OF THE DRAWINGS

The above and other features, advantages and aspects of examples of the disclosure will become more apparent with reference to accompanying drawings and in conjunction with the following specific embodiments. Throughout the accompanying drawings, the same or similar reference numerals indicate the same or similar elements. It should be understood that the accompanying drawings are schematic and components and elements are not necessarily drawn to scale.

FIG. 1 is a flowchart of a method for displaying information according to an example of the disclosure.

DETAILED DESCRIPTION OF EMBODIMENTS

Figure 2:
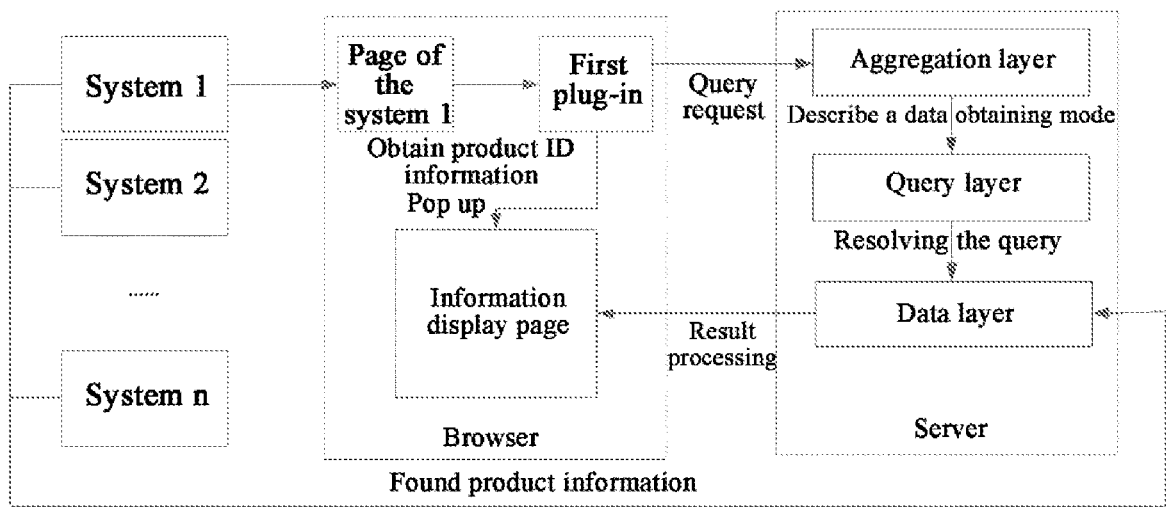
FIG. 2 is a schematic diagram showing interaction of a preset system, a browser and a server according to an example of the disclosure.

Examples of the disclosure will be described below in more detail with reference to accompanying drawings. Although some examples of the disclosure are shown in the accompanying drawings, it should be understood that the disclosure can be implemented in various forms and should not be constructed to be limited to the examples set forth herein, and on the contrary, these examples are provided for facilitating more thorough and complete understanding of the disclosure. It should be understood that the accompanying drawings and the examples of the disclosure are merely used for illustration rather than limitation to the protection scope of the disclosure.

It should be understood that steps described in a method embodiment of the disclosure can be executed in and/or parallel. Further, the method embodiment can include an additional step and/or omit a shown step, which does not limit the scope of the disclosure.

As used herein, the terms "comprise" and "include" and their variants indicate open-ended inclusion, that is, "including but not limited to". The term "based on" indicates "at least partially based on". The terms "an example" and "one example" indicate "at least one example". The term "another example" indicates "at least one another example". The term "some examples" indicates "at least some examples". Related definitions of other terms will be given in the following description.

It should be noted that concepts such as "first" and "second" mentioned in the disclosure are merely used to distinguish different devices, modules or units, rather than limit an order or interdependence of functions performed by these devices, modules or units.

It should be noted that a modification of "a" mentioned in the disclosure is schematic rather than limitative, and should be understood by those skilled in the art as "one or more" unless otherwise definitely indicated in the context. The phrase "A and/or B" in the disclosure includes three situations of juxtaposition: A; B; A and B, that is, at least one of A and B.

Names of messages or information exchanged among a plurality of devices in an embodiment of the disclosure are merely used for illustration rather than limitation to the scope of the messages or information.

A solution provided by the example of the disclosure will be described below in detail with reference to the accompanying drawings.

In the process of production in an enterprise, there will be various kinds of associated product information. The product information includes production information, inventory information, sales information, after-sales information, etc. For various reasons, different types of product information are stored in different systems in the enterprise. When a user wants to view whole-chain product information including the production information, the inventory information, the sales information and the after-sales information, one way is to select a main system, and product information from the other system is called to the main system to be aggregated. In the aggregation manner based on the main system, the information from the other system needs to be converted into a structure suitable for the main system before the information can be imported into the main system. As a result, limited by a framework of the main system, information display is inflexible and has a poor display effect, and the user is required to develop a corresponding interface, resulting in high cost and potential safety hazards. In addition, the main system can be merely used as an entry of the view in the main system rather than the other system.

A technical solution provided by the example of the disclosure will be described below with reference to FIGS. 1-7.

In some examples of the disclosure, a method for displaying information is provided. As shown in FIG. 1, the method is executed by a first plug-in of a browser, and includes S11-S12:

S11: Target information in a currently opened page is determined in response to a first operation event under the condition that a page of a first system is opened in a browser.

S12: Associated information of the target information is displayed.

In the example of the disclosure, the first system is one of at least two preset systems, and the associated information is derived from the other system except the first system in the at least two preset systems.

In some examples, the first operation event may include one or more operations. The first operation event may be a specific gesture operation executed by the user, and may also be that the user is triggered on a predetermined control in the browser, etc. When the first operation event is detected, the target information is determined based on the currently opened page of the browser. Since the target information is obtained based on the browser, the method in the example of the disclosure may be directly executed at any time and place through the browser without using a specific client side as an entry, and merely the first plug-in needs to be mounted in the browser. The browser described in the example of the disclosure may be independent browser software or a browser embedded in other software, such as a browser in an applet. In some examples of the disclosure, after the target information is determined, an information obtaining request is transmitted to a server through the first plug-in of the browser. The information obtaining request is used to cause the server to return associated information of the target information. In some examples, the first plug-in is to aggregate and display the associated information in the at least two preset systems, and obtain associated information from each preset system through an open application program interface of the system. In some examples, the at least two preset systems are internal systems. The server may search the associated information from these internal systems in real time and return the associated information to the browser for being displayed. Alternatively, information in the preset systems is pre-stored in the server, and the associated information may be directly returned in this case. For example, the target information may be production information of a certain product. The associated information may be inventory information, sales information and after-sales information of the product. The associated information may be in the form of a field, a text, a picture, a table, a link, etc. In some examples, a window may pop up in a browser, and the associated information may be displayed in the pop-up window. It is also possible to display the associated information in a preset area in the browser.

In some examples of the disclosure, when the browser opens a first system of preset systems, after the user performs the first operation event based on the first plug-in of the browser, the target information is obtained based on the currently opened page, and the associated information of the target information is displayed. Based on this, the user can conveniently perform query in any one system of the at least two preset systems. In the example of the disclosure, the associated information is obtained and displayed through the browser, such that the user can conveniently aggregate, search and display the associated information on different terminals at any time. The associated information is obtained by using the browser as an entry instead of a specific client side, such that query convenience is improved, integrity of information display is further improved, richness of information is improved, and the user can view complete information at any time without exiting from the page of the first system.

In some examples of the disclosure, the first operation event includes any one of the following: a triggering operation on the first plug-in of the browser, a selection operation on information in the currently opened page, and an input operation on the target information into an input box of the first plug-in of the browser.

In some examples of the disclosure, the first plug-in is mounted in the browser, and the user may trigger the first plug-in by clicking the first plug-in to complete the first operation event. In some other examples, when text information is displayed in the current page, the user may execute selection operations (such as underlining) on text displayed in the current page. For example, a left mouse button or a right mouse button is held down to select the text for underlining. In some other examples, an input box maybe displayed in the first plug-in, and the target information may be input into the input box, and the first plug-in searches for and displays associated information according to input target information.

In some other examples, the step that target information in a currently opened page is determined includes: the target information is determined based on an address of the currently opened page and/or a page content of the currently opened page. In some examples, after the browser opens the current page and the user executes the first operation event, the first plug-in obtains the address (for example, a website) of the first page and resolves the address to obtain the target information. For example, a relational table of addresses and corresponding target information may be stored in advance, and the target information may be determined from the relational table according to the address of the current page. In some other examples, the content displayed in the current page, such as text or an image in the current page, may be resolved, and the target information, such as a name, a code and a number may be extracted as the target information. In some other examples, a target identification may be determined by combining the address of the current page with the page content of the current page. If the target information that is determined based on the address of the current page and the page content of the current page corresponds to different objects, the target information may be determined preferentially according to the page content of the current page. For example, target information is determined according to the address of the current page as target information of object A and target information is determined according to the page content of the current page as target information of object B, the target information is determined as the target information of object B.

In some examples of the disclosure, the step that target information in a currently opened page is determined includes: the target information is determined based on a selection operation of information in the currently opened page. In some examples, the selection operation may be, for example, a selection operation of the content in the currently opened page through the mouse (usually holding down the left mouse button or the right mouse button to select the content). After the selection operation is performed on the content in the currently opened page, the first plug-in of the browser may identify the content on which the selection operation is performed, and determine the target information according to the content on which the selection operation is performed. For example, the content on which the selection operation is performed is an object name or an object code, the content on which the selection operation is performed may be directly used as the target information. In some other examples, the target information may be determined according to semantics of the content on which the selection operation is performed. For example, if the content on which the selection operation is performed is "a first railway independently designed and built by China", the target information may be determined as "Beijing-Zhangjiakou Railway". The target information may be a target object name or a target object code. The target information is associated with the target object. For example, the target information may be a serial number of certain product and the target object is the product corresponding to the serial number.

In some examples of the disclosure, the step that target information in a currently opened page is determined includes: the target information is determined based on an input operation into an input box of the first plug-in of the browser. In some examples, after a first operation (such as a click operation) is performed on the first plug-in, the input box is displayed, the user may input a content into the input box, and the target information may be determined according to the input content. The input content may be directly used as the target information, or semantic resolving may be performed on the input content to determine the target identification. Based on this, the user can conveniently search associated information of specific target information according to needs of the user.

Figure 3:
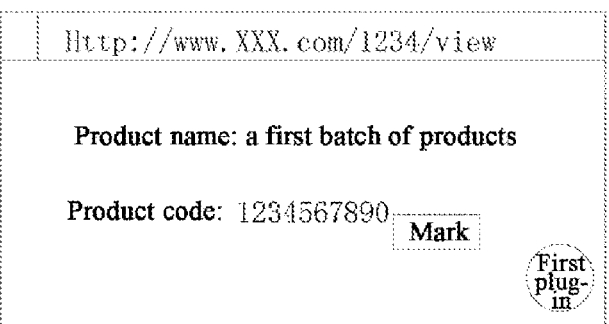
FIG. 3 is a schematic diagram of a current page according to an example of the disclosure.

In some examples of the disclosure, the step that the target information is determined based on an address of the currently opened page includes: an address field, corresponding to a target object, in the address of the currently opened page is identified, and the target information is determined based on the address field. In some examples, an address of a web page, such as a uniform resource locator, is divided into a plurality of segments with slashes, and the last two segments are often digital codes corresponding to the target object. The digital codes are used as address fields corresponding to the target object, and the target information may be the address field corresponding to the target object, that is, the target information may be information of the target object. For example, with reference to FIG. 3, the address field "1234" in FIG. 3 is the address field corresponding to the product, and the address field may be used as target information of the product.

In some examples of the disclosure, the step that the target information is determined based on a page content of the currently opened page includes: a target object name and/or a target object code in the page content of the currently opened page is identified, and the target information is determined based on the target object name and/or the target object code. In some examples, the target object name and the target object code (such as an identification (ID)) are usually displayed in the page content, and the target information may be determined according to one or more of the name and code. For example, as shown in FIG. 3, a product name and a product code are displayed in the page content, and one or two of the product name and the product code may be used as the target information of the product.

In some examples of the disclosure, the step that the target information is determined based on an address of the currently opened page and a page content of the currently opened page includes: an address field, corresponding to a target object, in the address of the currently opened page is identified, a target object name and/or a target object code in the page content of the currently opened page is identified, and the target information is determined based on the address field and the target object name and/or the target object code. In some examples, if the address field, the name and the code correspond to different target objects, a priority of a target object determined according to the name may be set higher than priorities of target objects determined according to the code and the address field, such that the target information determined based on the target object name may be adopted as determined target information.

In some examples of the disclosure, before the step that associated information of the target information is displayed, the method further includes: an information obtaining request is transmitted to a server, where the information obtaining request includes the target information; and query result information returned by the server is received, where the query result information includes the associated information of the target information. In some examples, the associated information of the target information is obtained from the server. Based on this, the information obtaining request may be transmitted to the server, and the server may search the associated information according to the target information and return the associated information to the first plug-in of the browser for being displayed. The server may obtain the associated information from the other system in real time after receiving the information obtaining request. Alternatively, associated information from the other system may be pre-stored in the server, and the associated information is directly returned to the first plug-in of the browser accordingly.

In some examples, an information type of the associated information is different from an information type of information displayed in the currently opened page. In some examples, associated information stored in the preset systems varies in information type, and associated information obtained from different systems vary in information type accordingly. For example, with the target information as a name of a product within a company as an example, production information of the product may be displayed in the page of the first system, and storage information of the product is stored in the other preset system. This is because product information is usually stored in a plurality of different internal systems. When it is necessary to obtain full chain information of the product, it is usually necessary to obtain all kinds of information of the product from different preset internal systems, so as to obtain complete associated information of the product. In some examples of the disclosure, variations in information type of the associated information indicate that associated information obtained in one preset system and associated information obtained in the other preset system are information for representing different features. For example, with the target object being the product as an example, the target information may be a name of the product, associated information stored in one preset system represents production information of the product, and associated information stored in the other preset system represents storage information of the product.

In some examples of the disclosure, the currently opened page is the page of the first system opened by the browser, the first system is a preset system, and the currently opened page displays information of the target object stored by the first system. In some examples, with reference to FIG. 2, the system may be other servers or other terminals, the page of a system 1 is opened in the browser, and the page of the system 1 is a page of the target object. After the user executes the first operation event, the first plug-in of the browser obtains the target information of the target object in the page of the system 1 in response to the first operation event. For example, in an example with a product being target object, product ID information is obtained. Then, an information obtaining request (a query request in FIG. 2) is transmitted to the server, and the server obtains associated information of the target object from other preset systems and transmits the associated information to the browser for being displayed on an information display page. In some examples, when the user browses a page of a target object in any preset system through the browser, associated information of the target object may be automatically obtained from this system and other preset systems for being aggregated and displayed. Based on this, the user can view the associated information in other preset systems without exiting from a currently browsed system.

In some examples of the disclosure, the information obtaining request further includes a preset information type; and the query result information includes associated information of the preset information type. In some examples, the first plug-in of the browser stores information types of the associated information that needs to be displayed, that is, specific associated information needs to be displayed. When information is displayed, if merely associated information is obtained from the systems, information redundancy is likely to occur if all associated information is displayed since abundant associated information is stored in the systems, and if all associated information is displayed, such that view by the user is not facilitated. As a result, the preset information type is set in advance. An information type of important associated information that needs to be viewed is specified at first, and then the important associated information is obtained, such that the problem that the important information cannot be displayed emphatically due to abundance of information.

In some examples of the disclosure, after the target identification is determined based on the address of the first page and/or the page content of the first page, the first identification is displayed in the browser if the query result information is received, and the query result information is displayed after the first identification is triggered. In some examples, the browser may be a separate browser application or a module having a browser function and embedded in the application. In some examples, with reference to FIG. 3, FIG. 3 schematically shows a first page. A target identification is determined based on an address of the first page (for example, "1234" in the address) and/or a page content (for example, a product name and a product code), and an information obtaining request is transmitted to a server. If the server may search associated information and returns query result information, the first identification is displayed.

If the query result information is not received, the first identification is hidden. After the first identification is triggered, for example, by clicking, the query result information is displayed, such that the first logo can be displayed merely when the query result information can be obtained, and the problem that a display failure occurs when the user clicks the first identification due to absence of associated information can be avoided.

In some examples of the disclosure, an enable control of the first plug-in is provided, and the enable control is caused to be in a disabled state by default. The first plug-in is caused to execute the steps that target information in a currently opened page is determined in response to a first operation event under the condition that a page of a first system is opened in the browser and associated information of the target information is displayed under the condition that the enable control is in the disabled state.

The first plug-in is caused to determine the target information in the currently opened page in response to an event of opening the page of the first system in the browser, display a mark that indicates existence of the associated information of the target information and display, under the condition that the mark is triggered, the associated information of the target information under the condition that the enable control is in an enabled state based on a user operation.

In some examples, the first plug-in of the browser has the enable control, such as a status switch in the first plug-in. The enable control has an enabled state and a disabled state, and is in the disabled state by default. In the disabled state, the user needs to execute the first operation event when the browser opens the page of the first system, so as to determine the target information and display the associated information. If the user wants to reduce the number of operations, the user may set the first plug-in to the enabled state. Based on this, when the first plug-in detects opening of the page of the first system by the browser, the target information in the opened page may be automatically detected, a specific mark is displayed if there is associated information of the target information, and a specific mark is not displayed if there is not associated information of the target information. Based on this, existence of the associated information can be directly known based on display of the specific mark without the user operation, instead of knowing existence of the associated information merely after triggering the first plug-in. If there is associated information, the mark is displayed, and the user may display the associated information of the target information by triggering the mark. In some examples, with FIG. 3 as an example, the enable control is in the enabled state, and the product code "1234567890" is regarded as the target information. The first plug-in may automatically obtain associated information in other preset systems from the server. A specific mark is displayed if the associated information is obtained. A specific mark is hidden if the associated information is not obtained. The obtained associated information is displayed after the specific mark is triggered, such that the problem that associated information is not displayed when the user clicks the specific mark is avoided.

In some examples of the disclosure, the step that associated information of the target information is displayed includes: an information display interface is opened, and the associated information is displayed in the information display interface. The information display interface has a preset display format, the preset display format has display positions for preset different types of information, and the associated information is displayed in the preset display format. In some examples, the associated information is displayed in the information display interface instead of the currently opened page. Based on this, the problem that the associated information in the other system is mixed with the information in the currently opened page of the first system, the user cannot distinguish the information in the first system from the information in the other system, and information disorder is caused is avoided. In addition, in some examples, the information display interface has the preset display format, the received associated information may be typeset in the preset display format, and preset display positions may be specified for different types of associated information, such that information disorder and inconvenient view by the user are avoided.

In some examples of the disclosure, the target information is associated with the target object, and the preset display format corresponds to the target object, and different target objects correspond to different preset display formats. Personalized display of different target objects is implemented. In addition, optimal display formats of information of different target objects are actually different, making it disadvantageous to adopt the same preset display format for reasonable display. As a result, different preset display formats are set for different target objects in some examples of the disclosure. Information in different formats may be displayed: text information, information boards, etc., and display forms such as digital tables/icons may be switched.

The method according to the example of the disclosure may be used to search, transmit, summarize and display product information (such as production information, storage information, test information and marketing and sales information) from a plurality of preset systems. The first plug-in in the browser may be used to summarize and display the associated information. The information display page may be customized to display associated information in different formats, such as text information and information boards, and display forms such as digital tables and icons may be switched.

Figure 4:
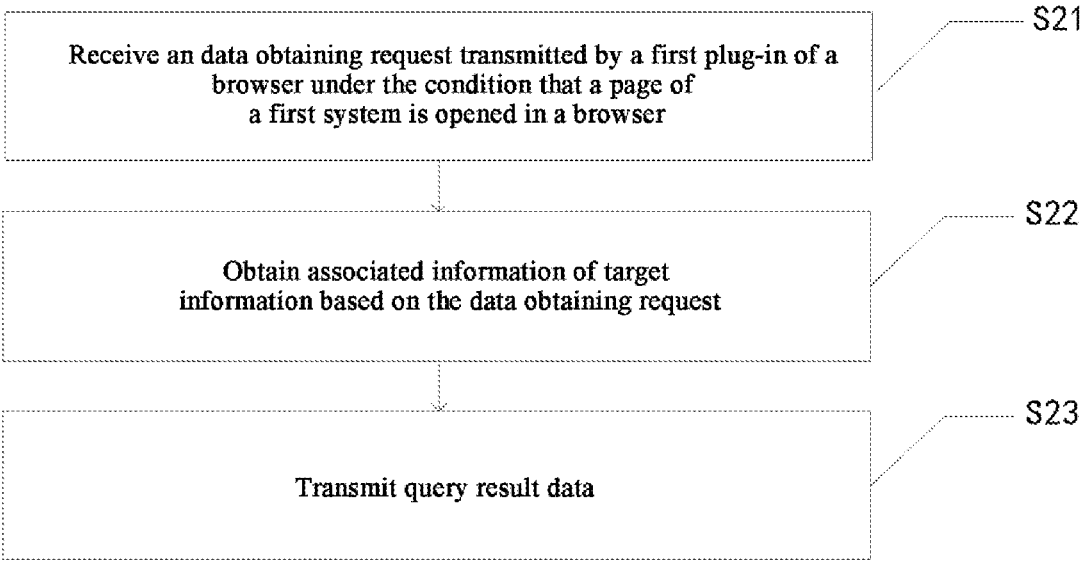
FIG. 4 is a flowchart of a method for processing information according to an example of the disclosure.

In some examples of the disclosure, a method for processing information is further provided. The method may be used in any server in the example of the disclosure, may cooperate with a first plug-in in any example of the disclosure, and include S21-S23 as shown in FIG. 4.

S21: An information obtaining request transmitted by a first plug-in of a browser is received under the condition that a page of a first system is opened in a browser.

In some examples, the browser is a browser in any example of the disclosure. In some examples, the first plug-in of the browser may determine the target information according to the currently opened page of the browser, and transmit the information obtaining request to the server, and the information obtaining request includes the target information. In some examples, the information obtaining request may be an information obtaining request in any example of the disclosure.

S22: Associated information of target information is obtained based on the information obtaining request.

In some examples, the first system is one of at least two preset systems, and the associated information is derived from the other system except the first system in the at least two preset systems. In some examples, the preset system may be a preset system in any example of the disclosure, and the server may obtain the associated information from the other system. An information type of the associated information obtained from the other system may be different from an information type of information displayed on the currently opened page of the first system, and different types of associated information may be stored in different preset systems. In some examples, the associated information of the other preset system may also be pre-stored in the server first, and the associated information of the other system may be directly from the server. In some examples, the preset system is an internal system, and the associated information cannot be obtained from any system. In some examples, when the associated information is obtained, a current login user of the browser has access to and authorizes the browser to obtain the associated information.

S23: Query result information is transmitted.

In some examples, the query result information includes the associated information of the target information. In some examples, information processing may be performed on the associated information in the query result information, for example, the associated information may be transmitted in a preset order. The associated information may be of various kinds, such as an address field, a text, a graph, a table, a picture, and a link, and may be production information, storage information, sales information, test information, etc. of an internal product of a company. In some examples, the returned query result information is returned to the first plug-in of the browser, the browser may displays the query result information, or the browser displays the query result information if certain conditions are satisfied. Since the query result information is obtained and displayed through the browser, the user can view the associated information of the target information at any time based on the first plug-in of the browser without downloading a dedicated client.

In some examples of the disclosure, the step that associated information of target information is obtained includes: a corresponding target object is determined based on the target information; and the associated information of the target information is obtained based on the target object and a preset information type. In some examples, since there may be abundant information stored in the preset system, it is difficult to obtain and display all the information at once. As a result, the preset information type may be specified first, and merely the associated information of the preset information type may be obtained. The preset information type may include, for example, a name, a code, production information, storage information, test information, etc. In some examples, the preset information type may be included in the information obtaining request sent by the first plug-in, the first plug-in determines the preset information type according to an information type displayed in the currently opened page of the browser, and the preset information type is different from the information type of the information in the currently opened page of the browser. Based on this, the display of information has the same kind as the information type displayed in the currently opened page when the associated information is displayed is avoided.

In some examples of the disclosure, the step that the associated information of the target information is obtained based on the target object and a preset information type includes: an information query statement is generated based on the target object, the preset information type and feature information of the other system, information query is performed in the other system according to the information query statement, and the associated information of the target information found from the other system is obtained.

In some examples, the feature information of the other system includes an information identification and an information type of stored associated information. In some examples, feature information of the preset system is pre-stored in the server, and describes an information type of the associated information stored in the preset system, that is, specific information is stored, and information identifications (such as names) of the information in these preset systems are stored. For example, when the target object is a product, the target information is a product name, and information to be searched is test information of the product. Determination of the test information of the product according to the feature information is represented by a variable "test" in the preset system, an information query statement is generated, and then the information query statement is resolved. For example, the information query statement is compiled into an instruction that may be understood by a computer, transmitted to the preset system for information query, and then found associated information returned by the preset system is received.

In some examples of the disclosure, the information query statement includes an information source paragraph and a condition paragraph. The information source paragraph is configured to represent information to be obtained and a system where the information is located, and the condition paragraph is configured to represent a condition to be satisfied by information obtained. In some examples, the information source paragraph may be used for providing knowledge of what data may be obtained from the systems, and the condition paragraph may be used for providing knowledge of which conditions are used for screening the information. For example, the information source paragraph may instruct that the information named "production date" needs to be obtained from a system 1, and the condition paragraph may instruct that associated information of a product with a name of first product 1 needs to be obtained.

In some examples of the disclosure, the information source paragraph includes: the preset information type, the other system where the associated information of the preset information type is located, and an information identification of the associated information of the preset information type in the other system. The condition paragraph includes the target object.

In some examples, the information query statement is described with the information source paragraph and the condition paragraph. The information source paragraph is used to determine an information obtaining manner, and adopts three-paragraph description including: a preset type information, other information of the other system where associated information of the preset information type is located and an information identification of the associated information of the preset information type in the other system. The preset information type is a kind of information to be obtained, and may be obtained from the information obtaining request, and the preset information type in the information obtaining request is used as the information obtaining kind. Other information of the other system where the associated information of the preset information type is located is used to describe the information source, that is, a preset other system where the associated information to be searched is located. Corresponding to the other system where the associated information of the preset information type is located, the information identification of the associated information of the preset information type in the other system is used to describe a variable that may be recognized by the other system, such as an information name corresponding to the associated information of the preset information type in the other system. For example, if product information is to be searched, the product information is stored in a product column of an information base in the other system, and then the information identification of the associated information of the preset information type in the other system is "product". The condition paragraph is used to describe the information obtaining condition, that is, conditions are satisfied for obtaining information. The target object is used as a determination condition. For example, when the target object is expressed as an object ID, associated information satisfying the specific object ID is searched through an information query statement.

Figures 5, 6:
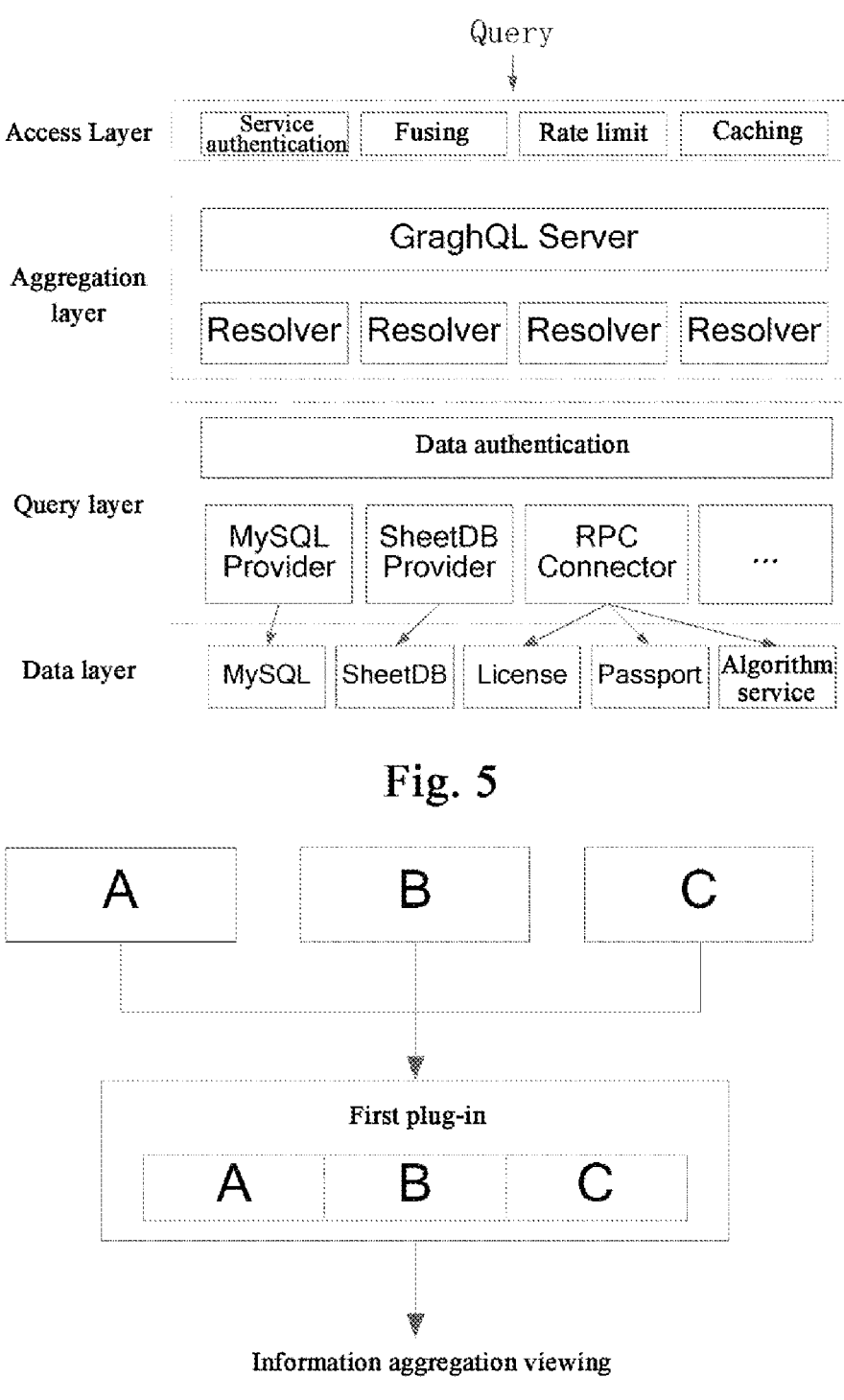
FIG. 5 is a schematic architecture diagram of a server according to an example of the disclosure.
FIG. 6 is a schematic diagram showing an aggregation process of associated information according to an example of the disclosure.

In some examples, in order to clearly describe execution steps of the server in the example of the disclosure, with reference to FIG. 5, FIG. 5 schematically shows an architecture of the server. In some examples, the server includes an access layer, an aggregation layer, a query layer and an information layer. In the access layer, an information obtaining request (Query) transmitted by a first plug-in of a browser is received. After receiving the information obtaining request, service authentication may be performed on the information obtaining request to determine whether there is a permission to obtain associated information of target information. Rate limit may be performed when a real-time visitor volume of the server exceeds a first preset value, an information transmission amount with the aggregation layer may be limited, and reception of the information obtaining request may be suspended when the real-time visitor volume exceeds a second preset value. A cache may be set in the access layer for temporarily storing the information obtaining request. The aggregation layer receives the target object associated to the target information transmitted from the access layer and a preset information type to be searched and then provides a unified entity information query language based on a GraphQL protocol. The aggregation layer has a resolver to resolve the information obtaining request to generate information query statements of an information source paragraph and a condition paragraph. A specific generation method is the same as described above. The information query statements are transmitted to the query layer. The information query statement is resolved at the query layer, and information authentication is performed first, so as to determine a permission to obtain associated information in other preset systems. In the presence of this permission, an accessible connection port of the other system (such as an information base) is connected with the other system, so as to obtain associated information of the target information stored in the other system. Different preset systems may use different databases. For example, MySQL database, SheetDB database, etc. may be used, and different databases need different connectors. As a result, MySQL Provider and SheetDB Provider may be used to be connected with corresponding databases, or remote login may be used to be connected with the other preset system. In this case, a remote procedure call protocol (RPC) connector may be used to call am algorithm service through a license file and a passport to obtain the associated information. In some examples, after the server obtains the information associated with the target information from the other system, the information is transmitted to the first plug-in of the browser, and is aggregated and displayed on the browser. In some examples, as shown in FIG. 6, the server transmits the associated information of the target information (A, B, C in FIG. 6) obtained from the other system to the first plug-in of the browser of a terminal, such that the first plug-in can aggregate the obtained associated information for the convenience of view by the user.

In some examples of the disclosure, an apparatus for displaying information is further provided. The apparatus is used by a first plug-in of a browser, and includes a determination unit and a display unit.

The determination unit is configured to determine target information in a currently opened page in response to a first operation event under the condition that a page of a first system is opened in the browser.

The display unit is configured to display associated information of the target information.

The first system is one of at least two preset systems, and the associated information is derived from the other system except the first system in the at least two preset systems.

In some examples of the disclosure, the first operation event includes any one of the following: a triggering operation on the first plug-in of the browser, a selection operation on information in the currently opened page, and an input operation on the target information into an input box of the first plug-in of the browser.

In some other examples, the determination unit determines target information in a currently opened page as follows: the target information is determined based on an address of the currently opened page and/or a page content of the currently opened page. Alternatively, the target information is determined based on a selection operation of information in the currently opened page. Alternatively, the target information is determined based on an input operation into an input box of the first plug-in of the browser.

In some examples of the disclosure, the determination unit determines the target information based on an address of the currently opened page as follows: an address field, corresponding to a target object, in the address of the currently opened page is identified, and the target information is determined based on the address field.

In some examples of the disclosure, the determination unit determines the target information based on a page content of the currently opened page as follows: a target object name and/or a target object code in the page content of the currently opened page is identified, and the target information is determined based on the target object name and/or the target object code.

In some examples of the disclosure, the determination unit determines the target information based on an address of the currently opened page and a page content of the currently opened page as follows: an address field, corresponding to a target object, in the address of the currently opened page is identified, a target object name and/or a target object code in the page content of the currently opened page is identified, and the target information is determined based on the address field and the target object name and/or the target object code.

In some examples of the disclosure, the apparatus for displaying information further includes a transmission unit. The transmission unit is configured to transmit an information obtaining request to a server, where the information obtaining request includes the target information. The transmission unit is configured to receive query result information returned by the server, where the query result information includes the associated information of the target information.

In some examples of the disclosure, the information obtaining request further includes a preset information type, and the query result information includes associated information of the preset information type. In some examples of the disclosure, an information type of the associated information is different from an information type of information displayed in the currently opened page.

In some examples of the disclosure, the apparatus for displaying information provides an enable control of the first plug-in, and the enable control is in a disabled state by default. Under the condition that the enable control is in the disabled state, the determination unit executes, through the first plug-in, the step that target information in a currently opened page is determined in response to a first operation event under the condition that a page of a first system is opened in the browser and associated information of the target information is displayed. The determination unit is configured to control the first plug-in to determine the target information in the currently opened page in response to the event of opening the page of the first system in the browser, display a mark that indicates existence of the associated information of the target information and display, under the condition that the mark is triggered, the associated information of the target information under the condition that the enable control is in an enabled state based on a user operation.

In some examples of the disclosure, the display unit is configured to open an information display interface, and display the associated information in the information display interface. The information display interface has a preset display format, the preset display format has display positions for preset different types of information, and the associated information is displayed in the preset display format.

In some examples of the disclosure, the target information is associated with a target object. Different target objects correspond to different preset display formats, and the associated information is displayed in the information display interface in the preset display format corresponding to the target object.

In some other examples the disclosure, an apparatus for processing information is further provided. The apparatus includes:

a transmission module configured to receive an information obtaining request transmitted by a first plug-in of a browser under the condition that a page of a first system is opened in the browser, where the information obtaining request includes target information; and an obtaining module configured to obtain associated information of the target information based on the information obtaining request, where the first system is one of at least two preset systems, and the associated information is derived from the other system except the first system in the at least two preset systems.

The transmission module is further configured to transmit query result information, where the query result information includes the associated information of the target information.

In some examples of the disclosure, the obtaining module obtains associated information of target information as follows: a corresponding target object is determined based on the target information, and the associated information of the target information is obtained based on the target object and a preset information type.

In some examples of the disclosure, the obtaining module obtains the associated information of the target information based on the target object and a preset information type as follows: an information query statement is generated based on the target object, the preset information type and feature information of the other system, information query is performed in the other system according to the information query statement, and the associated information of the target information found from the other system is obtained.

In some examples of the disclosure, the information query statement includes an information source paragraph and a condition paragraph, the information source paragraph is configured to represent information to be obtained and a system where the information is located, and the condition paragraph is configured to represent a condition to be satisfied by information obtained. In some examples, the feature information of the other system includes an information identification and an information type of stored associated information. The information source paragraph includes: the preset information type, the other system where the associated information of the preset information type is located, and an information identification of the associated information of the preset information type in the other system. The condition paragraph includes the target object.

As for the example of the apparatus, since this example basically corresponds to the example of the method, reference can be made to partial description of the example of the method for relevant contents. The example of the apparatus described above is merely illustrative, the modules described as separated modules can be physically separated, or not. Some or all of the modules may be selected according to actual needs to achieve the purposes of the solutions of the examples. What is described above can be understood and implemented by those skilled in the art without creative efforts.

The method and the apparatus of the disclosure are described above based on examples and application instances. In addition, the disclosure further provides a terminal and a storage medium, and the terminal and the storage medium will be described below.

Figure 7:
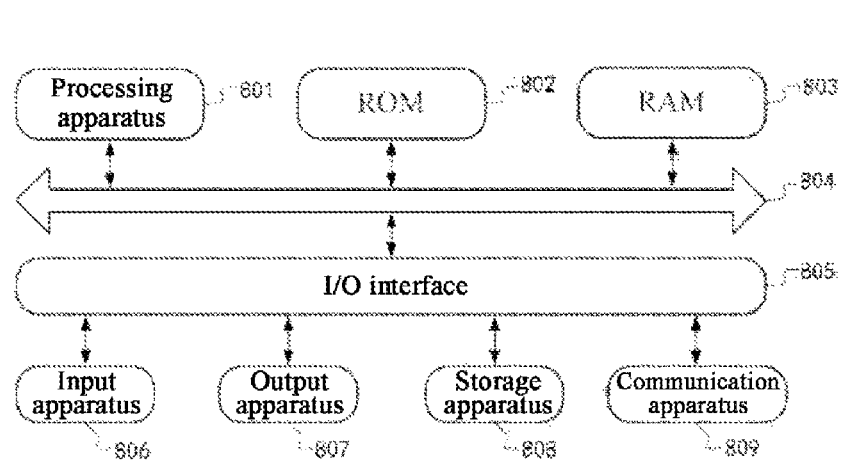
FIG. 7 is a schematic structural diagram of an electronic device according to an example of the disclosure.

With reference to FIG. 7, a structural schematic diagram of an electronic device 800 (for example, an electronic device may be a terminal device or a server, and a terminal device may also be referred to as a terminal) suitable for implementing the example of the disclosure. The terminal device in the example of the disclosure may include, but is not limited to, a mobile terminal such as a mobile phone, a notebook computer, a digital broadcast receiver, a personal digital assistant (PDA), a pad, a portable multimedia player (PMP), a vehicle-mounted terminal (such as a vehicle-mounted navigation terminal), and a fixed terminal such as a digital TV and a desktop computer. The electronic device shown in the figure is merely an instance, and should not be constructed as any limitation to functions and application scopes of the example of the disclosure.

The electronic device 800 may include a processing apparatus 801 (for example, a central processing unit, a graphics processing unit, etc.), which may execute various appropriate actions and processing according to a program stored in a read-only memory (ROM) 802 or loaded from a storage apparatus 808 to a random access memory (RAM) 803. The RAM 803 may further store various programs and data required for the operation of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touch screen, a touch pad, a keyboard, a mouse, a camera, a microphone, an accelerometer, a gyroscope, etc., an output apparatus 807 including, for example, a liquid crystal display (LCD), a speaker, a vibrator, etc., the storage apparatus 808 including, for example, a magnetic tape, a hard disk, etc., and a communication apparatus 809. The communication apparatus 809 may allow the electronic device 800 to be in wireless or wired communication with other devices for data exchange. Although the electronic device 800 having various apparatuses is shown in the figure, it should be understood that it is not required to implement or have all the devices shown. More or fewer devices may alternatively be implemented or provided.

In particular, according to the example of the disclosure, a process described above with reference to the flowchart may be implemented as a computer software program. For example, the example of the disclosure includes a computer program product, which includes a computer program carried on a computer-readable medium, and the computer program includes program codes for executing the method shown in the flowchart. In such an example, the computer program may be downloaded and mounted from the network through the communication apparatus 809, or mounted from the storage apparatus 808, or mounted from the ROM 802. When executed by the processing apparatus 801, the computer program executes the above functions defined in the method of the example of the disclosure.

It should be noted that the computer-readable medium described above in the disclosure may be a computer-readable signal medium or a computer-readable storage medium or any one of their combinations. For example, the computer-readable storage medium may be, including but not limited to, an electric, magnetic, optical, electromagnetic, infrared, or semiconductor system, apparatus or device, or any one of their combinations. More specific instances of the computer-readable storage medium may include, but not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any one of their suitable combinations. In the disclosure, the computer-readable storage medium may be any tangible medium including or storing a program, and the program may be used by or in combination with an instruction execution system, apparatus or device. In the disclosure, the computer-readable signal medium may include a data signal propagated in a baseband or as part of a carrier wave, in which a computer-readable program code is carried. This propagated data signal may have many forms, including but not limited to an electromagnetic signal, an optical signal or any one of their suitable combinations. The computer-readable signal medium may further be any computer-readable medium other than the computer-readable storage medium, and the computer-readable medium may send, propagate or transmit a program used by or in combination with the instruction execution system, apparatus or device. A program code included in the computer-readable medium may be transmitted by any suitable medium, including but not limited to: a wire, an optical cable, a radio frequency (RF) medium, etc., or any one of their suitable combinations.

In some embodiments, a client side and a server may communicate by using any currently known or future developed network protocol such as the hyper text transfer protocol (HTTP), and may be interconnected with digital data communication in any form or medium (for example, a communication network). Instances of the communication network include a local area network ("LAN"), a wide area network ("WAN"), internet work (for example, the Internet), an end-to-end network (for example, adhoc end-to-end network), and any currently known or future developed network.

The computer-readable medium may be included in the electronic device, or exist independently without being fitted into the electronic device.

The computer-readable medium carries one or more programs, and when executed by the electronic device, the one or more programs cause the electronic device to execute the method of the disclosure.

Computer program codes for executing the operations of the disclosure may be written in one or more programming languages or their combinations, and the programming languages include object-oriented programming languages such as Java, Smalltalk. C++, and further include conventional procedural programming languages such as "C" language or similar programming languages. The program codes may be completely executed on a computer of the user, partially executed on the computer of the user, executed as an independent software package, partially executed on the computer of the user and a remote computer separately, or completely executed on the remote computer or the server. In the case of involving the remote computer, the remote computer may be connected to the computer of the user through any kind of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various examples of the disclosure. In this regard, each block in the flowchart or block diagram may represent a module, a program segment, or a part of a code that includes one or more executable instructions for implementing specified logical functions. It should also be noted that in some alternative implementations, the functions noted in the blocks may occur in an order different than those noted in the accompanying drawings. For example, two blocks represented in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by a specific hardware-based system that executes specified functions or operations, or may be implemented by a combination of specific hardware and computer instructions.

The units involved in the example of the disclosure may be implemented by software or hardware. The name of the unit does not constitute limitation to the unit itself in some cases.

The functions described above herein may be executed at least in part by one or more hardware logic components. For example, without limitation, exemplary kinds of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the disclosure, a machine-readable medium may be a tangible medium, and may include or store a program that is used by or used in combination with the instruction execution system, apparatus or device. The machine-readable medium may be a machine-readable signal medium or a machine-readable storage medium. The machine-readable storage medium may include, but not limited to, an electric, magnetic, optical, electromagnetic, infrared, or semiconductor system, apparatus or device, or any one of their suitable combinations. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any one of their suitable combinations.

According to the example of the disclosure, [Instance 1] provides a method for displaying information. The method is executed by a first plug-in of a browser, and includes:

Target information in a currently opened page is determined in response to a first operation event under the condition that a page of a first system is opened in the browser and associated information of the target information is displayed.

The first system is one of at least two preset systems, and the associated information is derived from the other system except the first system in the at least two preset systems.

According to the example of the disclosure, [Instance 2] provides the method in Instance 1. The first operation event includes any one of the following:

a triggering operation on the first plug-in of the browser;
    a selection operation on information in the currently opened page; and
    an input operation on the target information into an input box of the first plug-in of the browser.

According to the example of the disclosure, [Instance 3] provides the method in Instance 1. The step that target information in a currently opened page is determined includes:

The target information is determined based on at least one of an address of the currently opened page and a page content of the currently opened page.

Alternatively, the target information is determined based on a selection operation on information in the currently opened page.

Alternatively, the target information is determined based on an input operation into an input box of the first plug-in of the browser.

According to the example of the disclosure, [Instance 4] provides the method in Instance 3.

The step that the target information is determined based on an address of the currently opened page includes: an address field, corresponding to a target object, in the address of the currently opened page is identified, and the target information is determined based on the address field.

The step that the target information is determined based on a page content of the currently opened page includes: at least one of a target object name and a target object code in the page content of the currently opened page is identified, and the target information is determined based on the at least one of the target object name and the target object code.

The step that the target information is determined based on an address of the currently opened page and a page content of the currently opened page includes: an address field, corresponding to a target object, in the address of the currently opened page is identified, at least one of a target object name and a target object code in the page content of the currently opened page is identified, and the target information is determined based on the address field and the at least one of the target object name and the target object code.

According to the example of the disclosure, [Instance 5] provides the method in Instance 1. Before the step that associated information of the target information is displayed, the method further includes:

An information obtaining request is transmitted to a server, where the information obtaining request includes the target information.

Query result information returned by the server is received, where the query result information includes the associated information of the target information.

According to the example of the disclosure, [Instance 6] provides the method in Instance 5.

The information obtaining request further includes a preset information type.

The query result information includes associated information of the preset information type.

According to the example of the disclosure, [Instance 7] provides the method in Instance 1.

An information type of the associated information is different from an information type of information displayed in the currently opened page.

According to the example of the disclosure, [Instance 8] provides the method in Instance 1.

An enable control of the first plug-in is provided, and the enable control is caused to be in a disabled state by default.

The first plug-in is caused to execute the steps that target information in a currently opened page is determined in response to a first operation event under the condition that a page of a first system is opened in the browser and display associated information of the target information under the condition that the enable control is in the disabled state.

The first plug-in is caused to determine the target information in the currently opened page in response to an event of opening the page of the first system in the browser, display a mark that indicates existence of the associated information of the target information and display, under the condition that the mark is triggered, the associated information of the target information under the condition that the enable control is in an enabled state based on a user operation.

According to the example of the disclosure, [Instance 9] provides the method in Instance 1. The step that associated information of the target information is displayed includes:

An information display interface is opened, and the associated information is displayed in the information display interface.

The information display interface has a preset display format, the preset display format has display positions for preset different types of information, and the associated information is displayed in the preset display format.

According to the example of the disclosure, [Instance 10] provides the method in Instance 9.

The target information is associated with a target object.

Different target objects correspond to different preset display formats, and the associated information is displayed in the information display interface in the preset display format corresponding to the target object.

According to the example of the disclosure, [Instance 11] provides a method for processing information. The method includes:

An information obtaining request transmitted by a first plug-in of a browser is received under the condition that a page of a first system is opened in the browser, where the information obtaining request includes target information.

Associated information of the target information is obtained based on the information obtaining request, where the first system is one of at least two preset systems, and the associated information is derived from the other system except the first system in the at least two preset systems.

Query result information is transmitted, where the query result information includes the associated information of the target information.

According to the example of the disclosure, [Instance 12] provides the method in Instance 11. The step that associated information of the target information is obtained includes:

A corresponding target object based on the target information is determined.

The associated information of the target information is obtained based on the target object and a preset information type.

According to the example of the disclosure, [Instance 13] provides the method in Instance 12. The step that the associated information of the target information is obtained based on the target object and a preset information type includes:

An information query statement is generated based on the target object, the preset information type and feature information of the other system.

Information query is performed in the other system according to the information query statement.

The associated information of the target information found from the other system is obtained.

According to the example of the disclosure, [Instance 14] provides the method in Instance 13.

The information query statement includes an information source paragraph and a condition paragraph.

The information source paragraph is configured to represent information to be obtained and a system where the information is located.

The condition paragraph is configured to represent a condition to be satisfied by information obtained.

According to the example of the disclosure, [Instance 15] provides the method in Instance 14. The information source paragraph includes: the preset information type, the other system where the associated information of the preset information type is located, and an information identification of the associated information of the preset information type in the other system.

The condition paragraph includes the target object.

The feature information of the other system includes an information identification and an information type of stored associated information.

According to the example of the disclosure, [Instance 16] provides an apparatus for displaying information. The apparatus is used by a first plug-in of a browser, and includes:

a determination unit configured to determine target information in a currently opened page in response to a first operation event under the condition that a page of a first system is opened in the browser; and a display unit configured to display associated information of the target information; where the first system is one of at least two preset systems, and the associated information is derived from the other system except the first system in the at least two preset systems.

According to the example of the disclosure, [Instance 17] provides an apparatus for processing information. The apparatus includes:

a transmission module configured to receive an information obtaining request transmitted by a first plug-in of a browser under the condition that a page of a first system is opened in the browser, where the information obtaining request includes target information; and an obtaining module configured to obtain associated information of the target information based on the information obtaining request, where the first system is one of at least two preset systems, and the associated information is derived from the other system except the first system in the at least two preset systems; where the transmission module is further configured to transmit query result information, where the query result information includes the associated information of the target information.

According to the example of the disclosure, [Instance 18] provides an electronic device. The electronic device includes:

at least one memory and at least one processor; where the at least one memory is configured to store program codes, and the at least one processor is configured to execute the method according to any one of [Instance 1]-[Instance 15] by calling the program codes stored in the at least one memory.

According to the example of the disclosure, [Instance 19] provides a computer-readable storage medium. The computer-readable storage medium is configured to store program codes, where the program codes are configured to execute the method according to any one of [Instance 1]-[Instance 15] when executed by a processor.

The examples described above are merely preferred examples of the disclosure and description of applied technical principles. It should be understood by those skilled in the art that the disclosed scope involved in the disclosure is not limited to the technical solution formed by a specific combination of the above technical features, but further covers other technical solution formed by any combination of the above technical features or their equivalent features without departing from the above concepts of the disclosure. For example, a technical solution formed by replacing the above features with (but not limited to) technical features having similar functions disclosed in the disclosure.

In addition, although the operations are depicted in a particular order, such a depiction should not be understood as a requirement that these operations be executed in the particular order shown or in a sequential order. In certain circumstances, multitasking and parallel processing can be favourable. Similarly, although several specific implementation details are included in the above discussion, these details should not be construed as limitation to the scope of the disclosure. Some features described in the context of a separate example can further be implemented in a single example in a combination manner. On the contrary, various features described in the context of a single example can further be implemented in a plurality of examples separately or in any suitable sub-combination manner.

Although the subject matter has been described in language specific to structural features and/or methodological logical acts, it should be understood that the subject matter defined in the appended claims is not necessarily limited to the specific features or acts described above. On the contrary, the specific features and actions described above are merely exemplary forms of implementation of the claims.

We claim:

1. A method for displaying information, executed by a first plug-in of a browser, comprising:

determining target information in a currently opened page in response to a first operation event under a condition that a page of a first system is opened in the browser and displaying associated information of the target information, wherein before displaying the associated information of the target information, the method further comprises:

transmitting an information obtaining request to a server, wherein the information obtaining request comprises the target information, and the server, based on the information obtaining request, obtains the associated information of the target information by constructing an information query statement, the information query statement comprises an information source paragraph and a condition paragraph, the information source paragraph is configured to represent information to be obtained and a system where the information is located, and the condition paragraph is configured to represent a condition to be satisfied by the information to be obtained;

wherein the first system is one of at least two preset systems, and the associated information is derived from other system except the first system in the at least two preset systems.

2. The method according to claim 1, wherein the determining target information in a currently opened page comprises:

determining the target information based on at least one of an address of a currently opened page and a page content of a currently opened page; or, determining the target information based on a selection operation on information in a currently opened page; or, determining the target information based on an input operation into an input box of a first plug-in of a browser.

3. The method according to claim 2, wherein the determining the target information based on an address of a currently opened page comprises: identifying an address field, corresponding to a target object, in an address of a currently opened page, and determining the target information based on the address field;

the determining the target information based on a page content of a currently opened page comprises: identifying at least one of a target object name and a target object code in a page content of the currently opened page, and determining the target information based on at least one of the target object name and the target object code; and the determining the target information based on an address of a currently opened page and a page content of a currently opened page comprises: identifying an address field, corresponding to a target object, in the address of a currently opened page, identifying at least one of a target object name and a target object code in a page content of the currently opened page, and determining the target information based on the address field and the at least one of the target object name and the target object code.

4. The method according to claim 1, wherein before the displaying associated information of the target information, the method further comprises:

receiving query result information returned by a server, the query result information comprises the associated information of the target information.

5. The method according to claim 4, wherein the information obtaining request further comprises a preset information type; and the query result information comprises the associated information of the preset information type.

6. The method according to claim 1, wherein the displaying associated information of the target information comprises:

opening an information display interface, and displaying the associated information in the information display interface;

wherein the information display interface has a preset display format, the preset display format has display positions for preset different types of information, and the associated information is displayed in the preset display format.

7. The method according to claim 6, wherein the target information is associated with a target object; and different target objects correspond to different preset display formats, and the associated information is displayed in the information display interface in the preset display format corresponding to the target object.

8. The method according to claim 1, wherein the first operation event comprises any one of the following:

a triggering operation on a first plug-in of a browser;

a selection operation on information in a currently opened page; and an input operation on target information into an input box of a first plug-in of a browser.

9. The method according to claim 1, wherein an information type of the associated information is different from an information type of information displayed in a currently opened page.

10. The method according to claim 1, comprising:

providing an enable control of the first plug-in, and causing the enable control to be in a disabled state by default;

causing the first plug-in to execute steps of the determining target information in a currently opened page in response to a first operation event under the condition that a page of a first system is opened in the browser and the displaying associated information of the target information under the condition that the enable control is in a disabled state; and causing the first plug-in to determine the target information in the currently opened page in response to an event of opening the page of the first system in the browser, display a mark that indicates existence of the associated information of the target information and display, under the condition that the mark is triggered, the associated information of the target information under the condition that the enable control is in an enabled state based on a user operation.

11. A method for processing information, comprising:

receiving an information obtaining request transmitted by a first plug-in of a browser under a condition that a page of a first system is opened in the browser, wherein the information obtaining request comprises target information;

obtaining associated information of the target information by constructing an information query statement based on the information obtaining request, wherein the first system is one of at least two preset systems, and the associated information is derived from other system except the first system in the at least two preset systems, the information query statement comprises an information source paragraph and a condition paragraph, the information source paragraph is configured to represent information to be obtained and a system where the information is located, and the condition paragraph is configured to represent a condition to be satisfied by the information to be obtained; and transmitting query result information, the query result information comprises associated information of the target information.

12. The method according to claim 11, wherein the obtaining associated information of the target information comprises:

determining a corresponding target object based on the target information;

obtaining associated information of the target information by constructing the information query statement based on the target object and a preset information type.

13. The method according to claim 12, wherein the obtaining associated information of the target information by constructing the information query statement based on the target object and a preset information type comprises:

constructing the information query statement based on the target object, the preset information type and feature information of the other system;

performing information query in the other system according to the information query statement;

obtaining associated information of the target information found from the other system.

14. The method according to claim 11, wherein the information source paragraph comprises the preset information type, the other system where the associated information of the preset information type is located, and an information identification of the associated information of the preset information type in the other system;

the condition paragraph comprises the target object;

feature information of the other system comprises an information identification and an information type of the stored associated information.

15. An electronic device, comprising:

at least one memory and at least one processor;

wherein the at least one memory is configured to store program codes, and program codes, when executed by the at least one processor, cause the electronic device to:

determine target information in a currently opened page in response to a first operation event under a condition that a page of a first system is opened in a browser and display associated information of the target information, wherein before the program codes cause the electronic device to display the associated information of the target information, the program codes further cause the electronic device to:

transmit an information obtaining request to a server, wherein the information obtaining request comprises the target information, and the server, based on the information obtaining request, obtains the associated information of the target information by constructing an information query statement, the information query statement comprises an information source paragraph and a condition paragraph, the information source paragraph is configured to represent information to be obtained and a system where the information is located, and the condition paragraph is configured to represent a condition to be satisfied by the information to be obtained;

wherein the first system is one of at least two preset systems, and the associated information is derived from other system except the first system in the at least two preset systems.

16. The electronic device according to 15, wherein the program codes causing the electronic device to determine target information in a currently opened page further cause the electronic device to:

determine the target information based on at least one of an address of a currently opened page and a page content of a currently opened page; or, determine the target information based on a selection operation on information in a currently opened page; or, determine the target information based on an input operation into an input box of a first plug-in of a browser.

17. The electronic device according to claim 16, wherein the program codes causing the electronic device to determine the target information based on an address of a currently opened page further cause the electronic device to: identify an address field, corresponding to a target object, in an address of a currently opened page, and determine the target information based on the address field;

the program codes causing the electronic device to determine the target information based on a page content of a currently opened page further cause the electronic device to: identify at least one of a target object name and a target object code in a page content of the currently opened page, and determine the target information based on at least one of the target object name and the target object code; and the program codes causing the electronic device to determine the target information based on an address of a currently opened page and a page content of a currently opened page further cause the electronic device to: identify an address field, corresponding to a target object, in the address of a currently opened page, identify at least one of a target object name and a target object code in a page content of the currently opened page, and determine the target information based on the address field and the at least one of the target object name and the target object code.

18. The electronic device according to 15, wherein the first operation event comprises any one of the following:

a triggering operation on a first plug-in of a browser;

a selection operation on information in a currently opened page; and an input operation on target information into an input box of a first plug-in of a browser.

19. The electronic device according to 15, wherein before the program codes cause the electronic device to display associated information of the target information, the program codes further cause the electronic device to:

receiving query result information returned by a server, the query result information comprises the associated information of the target information.

* * * * *